(12) United States Patent
Sahm et al.

(10) Patent No.: US 10,836,084 B2
(45) Date of Patent: *Nov. 17, 2020

(54) PLASTIC INJECTION MOLDING AND PROCESS

(71) Applicant: MAXI-LIFT, INC., Addison, TX (US)

(72) Inventors: Victor A. Sahm, Dallas, TX (US); Charles Hansen, Irving, TX (US)

(73) Assignee: Maxi-Lift, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,779

(22) Filed: Dec. 21, 2015

(65) Prior Publication Data

US 2016/0107345 A1 Apr. 21, 2016

Related U.S. Application Data

(63) Continuation of application No. 13/108,373, filed on May 16, 2011, now Pat. No. 9,216,836, which is a continuation of application No. 11/839,722, filed on Aug. 16, 2007, now Pat. No. 7,959,844.

(51) Int. Cl.

| B29C 45/00 | (2006.01) |
|---|---|
| B65D 1/26 | (2006.01) |
| B29C 49/00 | (2006.01) |
| B65D 1/46 | (2006.01) |
| B29K 23/00 | (2006.01) |
| B29L 31/00 | (2006.01) |
| B29K 105/00 | (2006.01) |

(52) U.S. Cl.
CPC ...... *B29C 45/0001* (2013.01); *B29C 49/0005* (2013.01); *B65D 1/26* (2013.01); *B65D 1/46* (2013.01); *B29K 2023/065* (2013.01); *B29K 2105/0094* (2013.01); *B29K 2995/0063* (2013.01); *B29L 2031/712* (2013.01)

(58) Field of Classification Search
CPC ... B29C 49/02; B29C 49/022; B29C 45/1705; B65D 1/46; B65D 1/26
See application file for complete search history.

(56) References Cited

U.S. PATENT DOCUMENTS

| 2,331,688 | A | * | 10/1943 | Hobson | ............... B29C 45/1705 |
|---|---|---|---|---|---|
| | | | | | 264/536 |
| 3,418,396 | A | * | 12/1968 | Edwards | ................. B32B 27/00 |
| | | | | | 156/244.11 |

(Continued)

FOREIGN PATENT DOCUMENTS

EP 1357136 A1 10/2003

*Primary Examiner* — Xiao S Zhao
*Assistant Examiner* — Emmanuel S Luk
(74) *Attorney, Agent, or Firm* — Foley & Lardner LLP

(57) ABSTRACT

Plastic containers are described herein that are injection molded with an high density polyethylene (HDPE) blow molding grade resin having a density of about 0.960 to about 0.965 g/cc, and a melt index of about 0.7 to about 1.0 g/10 min., at injection temperatures of about 570° F. to about 670° F., and mold cavity pressures of about 20,000 psig to about 27,000 psig. Relatively thin walled, rigid, containers, such as livestock feed containers, may be manufactured as described using about 20% to 50% less material while retaining strength and durability comparable to containers molded of HDPE injection molding grade resins.

14 Claims, 1 Drawing Sheet

(56) References Cited

U.S. PATENT DOCUMENTS

| | | | |
|---|---|---|---|
| 3,784,661 A * | 1/1974 | Schaul | B29C 49/0005 |
| | | | 264/209.3 |
| 4,077,760 A * | 3/1978 | Sauer | B29C 45/2708 |
| | | | 425/562 |
| 4,155,794 A | 5/1979 | Raabe et al. | |
| 4,363,619 A * | 12/1982 | Farrell | B29C 49/022 |
| | | | 264/503 |
| 4,507,405 A * | 3/1985 | Paisley | B29C 44/42 |
| | | | 521/84.1 |
| 5,215,764 A * | 6/1993 | Davis | B29C 45/60 |
| | | | 425/208 |
| 5,589,128 A | 12/1996 | Lai et al. | |
| 6,065,633 A | 5/2000 | Abbey | |
| 6,746,560 B1 | 6/2004 | Humphrey et al. | |
| 6,866,905 B1 * | 3/2005 | Sandstrom | B29C 49/061 |
| | | | 220/656 |
| 2002/0122883 A1 * | 9/2002 | Slat | B29C 49/0005 |
| | | | 427/237 |
| 2005/0037166 A1 | 2/2005 | Maziers | |
| 2006/0138141 A1 * | 6/2006 | Stolzman | B65D 45/34 |
| | | | 220/320 |
| 2006/0151425 A1 * | 7/2006 | Kelley | B65D 1/0223 |
| | | | 215/381 |
| 2006/0165930 A1 | 7/2006 | Easterday et al. | |
| 2008/0251487 A1 * | 10/2008 | Semersky | B29B 11/14 |
| | | | 215/12.1 |
| 2008/0257856 A1 * | 10/2008 | Melrose | B65D 1/0223 |
| | | | 215/381 |
| 2009/0191370 A1 * | 7/2009 | Camerani | B29B 11/12 |
| | | | 428/35.7 |
| 2013/0037507 A1 * | 2/2013 | Aoki | B29C 49/185 |
| | | | 215/40 |
| 2013/0108852 A1 * | 5/2013 | Kuhlman | C08G 73/1003 |
| | | | 428/220 |

* cited by examiner

PLASTIC INJECTION MOLDING AND PROCESS

CROSS REFERENCE TO RELATED APPLICATIONS

This application is a continuation of and claims the benefit of U.S. patent application Ser. No. 13/108,373 filed May 16, 2011, issuing as U.S. Pat. No. 9,216,836, which is a continuation of and claims the benefit of U.S. patent application Ser. No. 11/839,722 filed Aug. 16, 2007, issued as U.S. Pat. No. 7,959,844, the entirety of each of which is hereby incorporated by reference, and to the maximum extent allowable.

BACKGROUND

In the art of manufacturing molded plastic containers and the like, blow molding processes and injection molding processes have evolved. Relatively thin walled containers of a high density polyethylene (HDPE) polymer material can be blow molded using certain polymers and certain blow molding equipment. For example, HDPE polymers for blow molding consumer milk containers have a density of approximately 0.960 to 0.965 g/cc. On the other hand, relatively low to medium density polyethylene polymers (0.900 to 0.960 g/cc) are used in thicker walled, non-rigid containers such as large trashcans. HDPE grade resins for blow molding typically have a melt index of about 0.7 to 1.0 grams/10 min., whereas resins and polymers for injection molding have a melt index of about 6.0 or more grams/10 min.

In manufacturing containers for agricultural applications such as livestock feed tubs and the like, it is desirable to provide a rigid, durable container which is economical to produce and uses a minimum amount of polymer material. Those manufacturers equipped with injection molding equipment for manufacturing components/containers would benefit from being able to use a blow molding grade HDPE resin, but the expense of adding blow molding equipment to the manufacturing assets may not be warranted. Moreover, until now, the ability to use injection molding equipment to mold parts with a blow molding grade resin has not been successful, principally in part because of the low melt index and slow flow characteristics of blow molding resins. It is to these ends that the present invention has been developed.

Overview

The present invention is directed to a new and improved process for manufacturing molded plastic components, such as, for example livestock feed containers, formed of blow molding grade resins but using injection molding apparatus. In particular, the described herein is a process for manufacturing containers, such as agricultural/livestock feed containers, formed of HDPE blow molding grade resin, wherein the containers are molded using an injection molding apparatus and injection molding process.

In accordance with an important embodiment, the plastic injection molding process described herein allows the above and enables a reduction in the amount of material required to manufacture certain types of containers, such as livestock feed tubs, using, for example, approximately 20% to 50% less material than was previously required. In particular, containers comprising generally cylindrical or rectangular livestock feed tubs ranging in size from about 15.0 inches and to about 25.0 inches diameter or width, and by about 5.0 inches and to about 25.0 inches depth, may be manufactured by the process described herein with a wall thickness in the range of about 0.070 to about 0.150 inches. Moreover, typical HDPE molding temperatures may be maintained while injection or mold cavity pressures are raised to a range of about 20,000 psig to 27,000 psig to accomplish the molding described herein, without premature solidification of the resin in the mold. Still further, blow molding grade HDPE resins having a density in the range of about 0.958 to 0.965, and a melt index of about 0.7 to 1.00 grams/10 min., have been used with the injection molding equipment, such as described herein. Molding temperatures may be raised to a range of about 570° F. to 670° F., and injection pressures to a range of about 2000 psig to 2300 psig, without suffering premature solidification or other product defects.

Also described and provided herein are improved molded plastic containers formed of HDPE blow molding grade resin that have been molded by an injection molding process and equipment, such as that described herein, which serve as a representative example.

Those skilled in the art will further appreciate the above-mentioned advantages and superior features of the invention together with other important aspects thereof upon reading the detailed description which follows in conjunction with the drawings.

DETAILED DESCRIPTION

Figure 1:
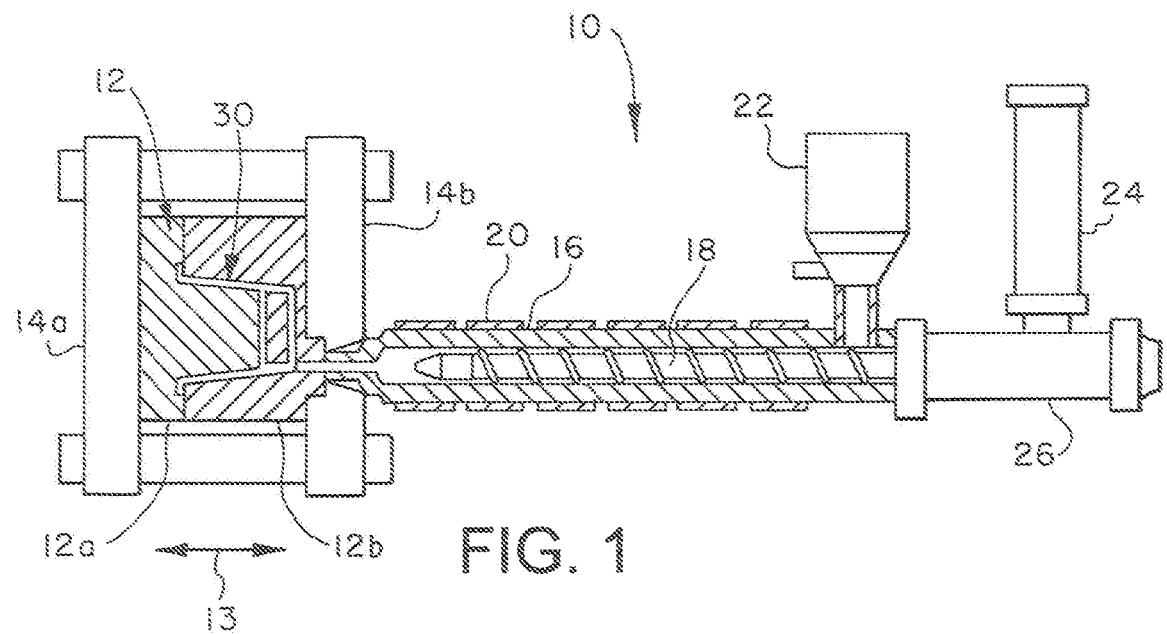
FIG. 1 is a schematic diagram of a representative injection molding apparatus used in connection with the molding process as described herein.

In the description which follows, like elements are marked with the same reference numerals throughout the specification and drawing. The drawing figures are not necessarily to scale and certain elements are shown in schematic form in the interest of clarity and conciseness.

Referring to FIG. 1, there is illustrated a schematic diagram of representative major components of an injection molding apparatus or system, generally designated by the reference numeral 10. The injection molding apparatus or system 10 may be of a type commercially available, such as a 1125 ton injection molding machine available from Cincinnati Milacron, Cincinnati, Ohio. The schematic of FIG. 1 is intended to be representative and to represent only major components of a typical injection molding system which may be utilized for carrying out the process described herein. Accordingly, in the example, the system 10 may include a two-part mold assembly 12, including opposed separable mold parts 12a and 12b disposed between clamping mechanism components 14a and 14b. The clamping components 14a and 14b may be moved toward and away from each other in the directions of arrow 13. An injection cylinder 16 is suitably connected to the mold assembly 12 and includes an injection screw 18 disposed therein. Suitable heater bands 20 are disposed around the exterior of the cylinder 16 for heating the plastic material to a melt form to be injected into the mold 12. A feed hopper 22 is provided to hold the appropriate supply of polymer pellets, which are then metered into the interior of the cylinder 16 where the pellets are heated to a fluid state for injection into the mold. An injection drive unit 26 is operably connected to the screw 18 and the cylinder 16 in a known manner, and an accumulator 24 is operatively coupled to the drive unit 26.

In accordance with the process described herein, containers are manufactured with injection molding apparatus like that of the system 10, but using pellets of HDPE resin with a material density in a range of about 0.958 to 0.965 g/cc, as distinguished from material of a density of about 0.900 to 0.955 g/cc, which is that typically associated with an injection molding grade of HDPE copolymer. Moreover, the high density polymer material used has a melt index in the range of about 0.7 to 1.0 grams/10 min.

Figure 2:
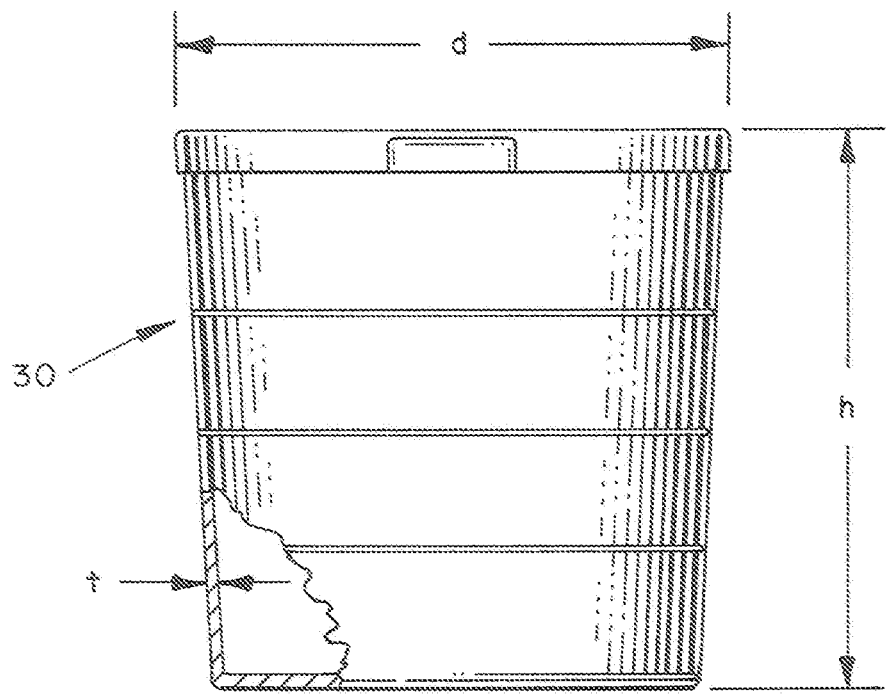
FIG. 2 is a side elevation, partially sectioned, of a representative injection molded container manufactured by the process described herein.

FIG. 2 illustrates a representative tub 30, such as a livestock feed container, which was manufactured in accordance with an injection molding process as just described and using the described high density resin material. The tub 30 is a substantially cylindrical container having a diameter "d", an overall height "h" and a wall thickness "t". More particularly, containers such as those prepared herein may have a diameter "d" in the range of about 15.0 inches to about 25.0 inches, an overall height "h" in the range of about 5.0 inches to about 25.0 inches, and wall thickness "t" in the range of about 0.070 inches to about 0.150 inches and may be produced using the injection molding process described herein. Containers such as tub 30 within said dimensional ranges have been fabricated with the described high density HDPE resin having a melt index in the range of 0.7 to 1.0 g/10 min. This is compared with injection molding HDPE resins which typically have a melt index of about 6.0 to 7.0 g/10 min. It has also been determined that using the process of this invention, a savings in resin material of about 20% to as much as 50% can be achieved.

Using the processes as described herein for manufacturing containers 30 of the heretofore described dimensions, resin injection temperatures have been raised to about 570° F. to 670° F., with injection velocities in the range of about 3.8 to 4.0 in/sec., and fill pressures in the range of about 2000 to 2260 psi. Mold cavity pressures in the range of 20,000 psig to 27,000 psig were also obtained.

Accordingly, contrary to conventional practice in which blow molding has been required for producing relatively thin walled cylindrical containers and the like, the description herein has successfully used injection molding processes for producing such thin walled cylindrical containers and products.

Although representative processes and articles have been described in detail herein, those skilled in the art will recognize that various substitutions and modifications may be made without departing from the scope and spirit of the invention as described and defined by the appended claims.

What is claimed is:

1. A method of injection molding a thin walled container comprising:
  injecting into one cavity for an injection molding apparatus a blow molding grade high density polyethylene polymer resin in a form for injection molding, the blow molding grade resin being a resin of a type for a blow molding injection process, and having a melt index suitable for a blow molding injection process,
  wherein the blow molding grade high density polyethylene polymer resin has a density in a range from about 0.958 to about 0.965 g/cc,
  wherein the melt index is in a range from about 0.7 to about 1.0 g/10 min; and
  molding in the one cavity an entire thin walled container using the blow molding grade resin while using the injection molding apparatus, the entire thin walled container when formed having a sidewall thickness in a range from about 0.070 inches to about 0.150 inches, and
  wherein injecting the blow molding grade high density polyethylene polymer resin into the one cavity includes having a cavity pressure of the one cavity in a range from greater than 20,000 psig to about 27,000 psig, and
  wherein injecting the blow molding grade high density polyethylene polymer resin into the one cavity is at a velocity in a range from about 3.8 inches per second to about 4.0 inches per second.

2. The method of claim 1 wherein:
  injecting the blow molding grade high density polyethylene polymer resin into the one cavity is at a temperature in a range from about 570° F. to about 670° F.

3. The method of claim 1 wherein:
  molding in the one cavity includes providing a one mold as a two-part assembly.

4. The method of claim 1 wherein:
  the method further comprises connecting an injection cylinder to the one cavity, and disposing heater bands around an exterior of the injection cylinder for heating the blow molding grade high density polyethylene polymer resin in a form for injection molding.

5. A method of injection molding a thin walled container comprising:
  injecting, at a velocity in a range from about 3.8 inches per second to about 4.0 inches per second, into one cavity for an injection molding apparatus a blow molding grade high density polyethylene polymer resin in a form for injection molding, the blow molding grade resin being a resin of a type for a blow molding injection process, and having a melt index suitable for a blow molding injection process,
  wherein the melt index is in a range up to about 1.0 g/10 min; and
  molding in the one cavity an entire thin walled container using the blow molding grade resin while using the injection molding apparatus, the entire thin walled container when formed having a sidewall thickness in a range from about 0.070 inches to about 0.150 inches,
  wherein injecting the blow molding grade high density polyethylene polymer resin into the one cavity includes having a cavity pressure of the one cavity in a range from greater than 20,000 psig to about 27,000 psig.

6. A method of injection molding a thin walled container comprising:
  injecting, at a velocity in a range from about 3.8 inches per second to about 4.0 inches per second, into one cavity for an injection molding apparatus a blow molding grade high density polyethylene polymer resin in a form for injection molding, the blow molding grade resin being a resin of a type for a blow molding injection process, and having a melt index suitable for a blow molding injection process,
  molding in the one cavity an entire thin walled container using the blow molding grade resin while using the injection molding apparatus, the entire thin walled container when formed having a sidewall thickness in a range from about 0.070 inches to about 0.150 inches,
  wherein injecting the blow molding grade high density polyethylene polymer resin into the one cavity includes having a cavity pressure of the one cavity in a range from greater than 20,000 psig to about 27,000 psig.

7. A method of injection molding a thin walled container comprising:

injecting into one cavity for an injection molding apparatus a blow molding grade high density polyethylene polymer resin in a form for injection molding, the blow molding grade resin being a resin of a type for a blow molding injection process, and having a melt index suitable for a blow molding injection process, molding in the one cavity an entire thin walled container using the blow molding grade resin while using the injection molding apparatus, the entire thin walled container when formed having a sidewall thickness in a range from about 0.070 inches to about 0.150 inches, and wherein injecting the blow molding grade high density polyethylene polymer resin into the one cavity includes having a cavity pressure of the one cavity in a range from greater than 20,000 psig to about 27,000 psig, and wherein injecting the blow molding grade high density polyethylene polymer resin into the one cavity is at a velocity in a range from about 3.8 inches per second to about 4.0 inches per second.

8. A method of injection molding a thin walled container comprising:

injecting into a cavity for an injection molding apparatus a blow molding grade resin in a form for injection molding, the blow molding grade resin being a resin of a type for a blow molding injection process, and having a melt index suitable for a blow molding injection process; and molding in the cavity an entire thin walled container using the blow molding grade resin while using the injection molding apparatus, wherein injecting the blow molding grade resin into the cavity is at a velocity in a range from about 3.8 inches per second to about 4.0 inches per second.

9. The method of injection molding a thin walled container, according to claim 8, wherein injecting the resin into the cavity includes having a cavity pressure of the one cavity in a range from greater than 20,000 psig to about 27,000 psig.

10. The method of injection molding a thin walled container, according to claim 8, wherein the resin has a density in a range from about 0.958 to about 0.965 g/cc.

11. The method of injection molding a thin walled container, according to claim 8, wherein the melt index is in a range from about 0.7 to about 1.0 g/10 min.

12. The method of injection molding a thin walled container, according to claim 8, wherein the entire thin walled container when formed has a sidewall thickness in a range from about 0.070 inches to about 0.150 inches.

13. The method of injection molding a thin walled container, according to claim 8, wherein the blow molding grade resin comprises a high density polyethylene polymer resin.

14. A method of injection molding a thin walled container comprising:

injecting into a cavity for an injection molding apparatus a blow molding grade resin in a form for injection molding, the blow molding grade resin being a resin of a type for a blow molding injection process, and having a melt index suitable for a blow molding injection process; and molding in the cavity an entire thin walled container using the blow molding grade resin while using the injection molding apparatus, wherein injecting the resin into the cavity includes having a cavity pressure of the one cavity in a range from greater than 20,000 psig to about 27,000 psig.

* * * * *